July 8, 1941. R. F. MATTHEWS 2,248,371
VALVE FOR PNEUMATIC TIRES
Filed Aug. 10, 1938
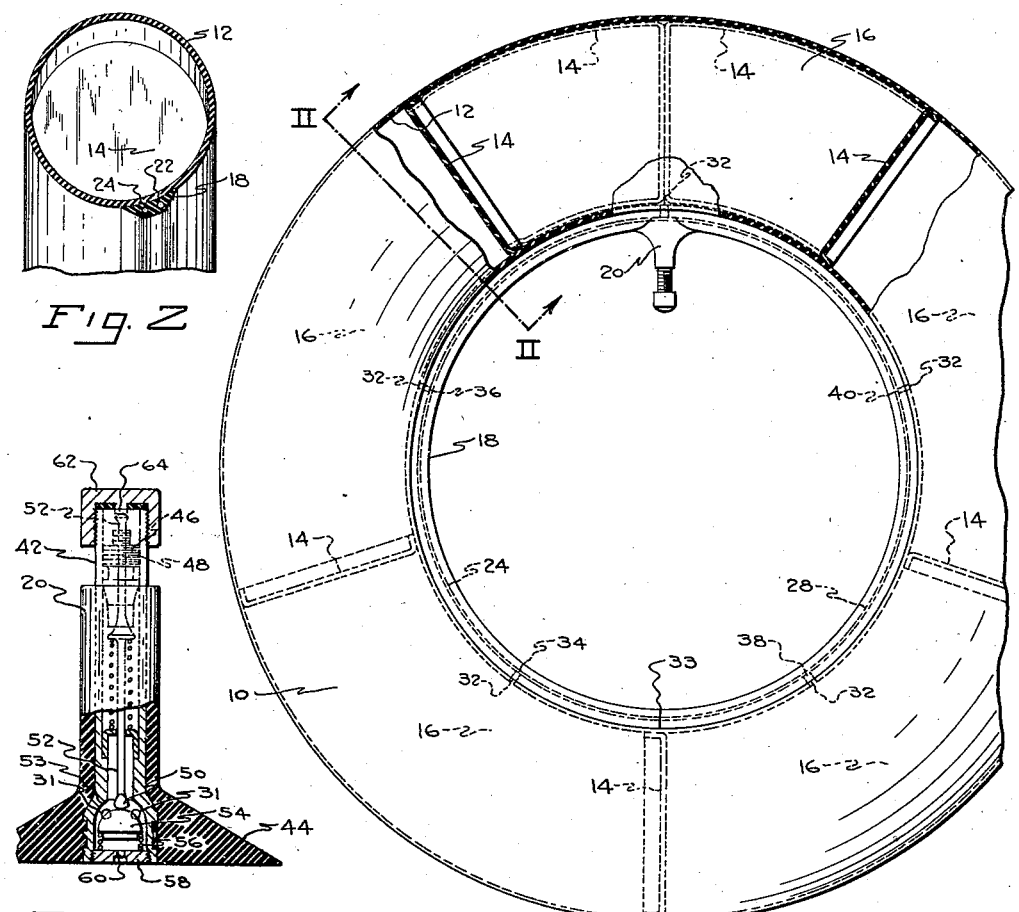
Inventor
RICHARD F. MATTHEWS
By Beaman & Langford
Attorneys Patented July 8, 1941

2,248,371

UNITED STATES PATENT OFFICE 2,248,371

VALVE FOR PNEUMATIC TIRES

Richard F. Matthews, Norvell, Mich.

Application August 10, 1938, Serial No. 224,009

1 Claim. (Cl. 277—42)

The present invention relates to an inflating valve for pneumatic inner tubes for pneumatic tires, being particularly concerned with a cellular or multi-compartment type of inner tube.

Heretofore cellular and multi-compartment inner tubes have been proposed to facilitate repair or replacement, as well as to eliminate to some degree the hazards connected with a blowout of a conventional single cell pneumatic tube. Such prior constructions have been expensive and difficult to manufacture and either only retard deflation of the inner tube upon failure or result in one cell becoming completely deflated with complete lack of support for the outer tire casing embracing that particular cell.

According to the present structure a multi-compartment inner tube is provided having radial or transversely disposed extensible partitions or bulkheads which are displaced circumferentially of the tube upon differential reduction of pressure in adjacent compartments so as to effect displacement of the adjacent compartments into the space formerly occupied by an inflated compartment in which the pressure has been reduced. In the preferred form, each compartment of the tube is capable of being individually inflated or deflated through a common air distributor.

Thus, one of the objects of the invention resides in an improved inflating valve for an inner tube for pneumatic tires having a plurality of circumferentially spaced partitions or bulkheads dividing the tube up into separate compartments and capable of expanding into one another upon relative reductions in pressure in adjacent compartments as might result from a puncture or blow-out, and whereby the inflation of the tire is substantially maintained notwithstanding the collapse of a compartment of the inner tube.

A further object resides in the use of an equalizer cap usable after inflating the tube to permit air flow from compartment to compartment until the air pressure in all compartments is equal.

Other advantages and objects of the invention residing in the specific arrangement, construction and combination of parts will be hereinafter set forth in connection with the detailed description and embodied in the annexed claim.

In the drawing—

Fig. 1 is a side elevational view of the preferred form of an inner tube partly shown in broken section, Fig. 2 is a cross-sectional view taken on line II—II of Fig. 1, Fig. 3 is a partial cross-sectional view taken on line III—III of Fig. 4, of the distributing valve, Fig. 4 is a plan view of the air distributor assembly vulcanized in the preferred form of the tube, Fig. 5 shows my method of vulcanizing the partition or bulkhead within the tube, and Fig. 6 is a cross-sectional view of a modified form of a bulkhead with a port.

Referring to the drawing, in Fig. 1 is shown a pneumatic rubber tube generally designated by the reference character 10, the tube being of that type conventionally used for the inflation of pneumatic tires. Circumferentially spaced within the outer wall 12 of the tube 10 are partitions of bulkheads 14 suitably vulcanized or molded in situ. Preferably, the partitions 14 are fabricated from readily stretchable sheet rubber so as to have considerable stretch or expansion when one side only is subjected to the normal pressures of inflation for pneumatic tires. In the illustrated form, the partitions 14 are impervious, although it is anticipated that very minute ports may be provided in the partitions 14 to assure equalization of the air pressure in each compartment 16 during operation. It is to be understood, however, that these minute ports would not interfere with the characteristic operation of the partitions 14 which takes place upon sudden relative reduction in pressure in adjacent compartments, but would merely permit a very slight amount of air to pass from one compartment to the other over a considerable period of time to effect equalization.

The air distributor structure for individually inflating or deflating the compartments 16 of the tube 10 comprises a thin narrow strip 18, preferably of rubber, having a valve stem 20. The strip 18 has longitudinal passageways 22, 24, 26 and 28, as shown in Fig. 4, which communicate with ports 31 of the valve stem 20. To balance the assembly as much as possible, the strip 18 may be extended around the entire inner circumference of the tube 10, as shown, with the opposite ends thereof meeting at 33. The passages 22, 24, 26 and 28 are sealed in a suitable manner, not shown, at the opposite ends of the strip 18. Suitable punched or molded holes 32 in the wall 12 of the tube 10 register with the ports 34, 36, 38 and 40, which open into the passageways 22, 24, 26 and 28, respectively. It will be noted that there is no direct intercommunication between the compartments 16 through the passageways 22, 24, 26 and 28 other than through the valve mechanism.

The valve stem 20 comprises a metal insert 42 about which the conical base or pad 44 is molded for vulcanizing the same to the wall 12 together with the strip 18. In practice, the valve stem and the strip 18 may be either molded as a unit or separately molded and then vulcanized together. In this connection, it is also feasible to fabricate the tube wall 12 with an integral thickened strip portion carrying the passageways shown in the strip 18. A valve core 46 is threaded into the insert 42 at 48, with the lower end 50 of the pin 52 of the core 46 directly adjacent a semispherical seat 53 into which the ports 31 open. A rubber valve 54 fitting seat 53 is continuously urged against the said seat 53 by a spring 56 to close the ports 31. A plug 58 functions as a seat for the spring 56 and is provided with a port 60 through which air passes in connection with the inflation and deflation of the compartment directly behind the stem 20 and in direct communication therewith. When the pin 52 is depressed by an air chuck for inflating the tube or by the special cap 62, as illustrated in Fig. 3, or is depressed in some suitable manner to exhaust air from the tube 10, the lower end 50 will unseat the valve 54 and open the ports 31. As the port 60 opens into the chamber defining the seat 53 with the valve 54 removed from its seat, the port 60 will be in communication with the same conduits as the ports 31 with the result that air will be admitted and exhausted from the tube compartments into which the port 60 opens in a manner similar to the tube compartments with which ports 31 communicate. Thus it will be seen that by supplying air to the inner tube 10 by means of an air chuck connected to valve 20, air may be equally directed into each compartment 16. The cap 62 may be used to equalize the pressure between compartments, and various means may be used to depress valve pin 52 to exhaust air from all of the compartments 16.

In Fig. 3 is shown a special cap 62, which when screwed entirely down upon the threaded valve stem 20 will seal the air pressure in the tube 10, while at the same time the projection 64 depresses the pin 52, which in turn forces the valve 54 from its seat, permitting equalization of the pressures in the several compartments 16 for the reason that the ports 31 and 60 are then in communication with one another for the free flow of air to areas of lower pressure. In practice, the cap 62 would only be used to depress the pin 52 following inflation of the tube 10. At all other times the cap 62 would be merely backed off upon the threads of the stem 20 sufficiently to have the projection 64 clear the end of pin 52.

In dotted outline in Fig. 1 in the uppermost compartment 16 the defining partitions or bulkheads 14 are shown expanded into the former compartment space following a reduction of pressure therein as might result from a puncture or blow-out. Obviously, filling in the former compartment will result in the pressure in all remaining compartments being somewhat lowered, yet well within an operating range. No attempt has been made to indicate by dotted line representation the extension of the remaining partitions 14 that will necessarily take place. A blow-out or puncture in any one compartment 16 will in no way interfere with the operation of the running wheel equipped with my improved tube, the only effect being a slight but relatively uniform reduction in pressure throughout the entire tube. While prolonged operation of a tire having a tube with a collapsed compartment is not intended, several hundred miles' travel following a blow-out in one compartment is found to have no appreciable detrimental effect upon the partitions 14, which expand to fill in the collapsed pressure retaining compartment.

In Fig. 5 I have shown my preferred method of fabricating the partition 14 within the wall 12 of the tube. With the tube turned wrong side out, it is threaded over and then down through a ring 70, backing up the vulcanizing operation of the partition 14 in its proper place within the tube. A heated platen 72 is used for applying the required heat and pressure for the vulcanizing operation.

The representation in the drawings of five compartments 16 is merely for purposes of illustration, and it is not my intention to limit the tube to any particular number of compartments. Experiments have indicated that as few as three compartments in a standard size inner tube will give satisfactory results, particularly if the partitions 14 are fabricated from rubber sheeting capable of considerable extension without rupture under normal tire pressures. By increasing the number of compartments 16, the amount of extension of the partitions 14, in order to fill a collapsed compartment, is obviously reduced and less attention need be given to the physical construction of the rubber sheeting from which the compartments are fabricated. The method disclosed in Fig. 5 is only one of several ways to manufacture the tube.

In Fig. 6 is shown the partition 14' with a very minute equalizing port 74 which has been very materially exaggerated in size in the drawings for the purpose of illustration. The function of the port 74 is to insure equalized pressure in all of the compartments of the tube. In practice the port 74 will be reinforced in any well known manner so as to prevent enlargement upon expansion or extension of the partition 14' such as would take place upon a puncture or blow-out resulting in a collapse of one of the compartments. It is to be understood that the amount of air that escapes through the port 74 is exceedingly small and should the wall 12 of the tube be blown out or punctured it would take a considerable period of time for the tube to be deflated and that the partition 14' would function in the same manner as the partition 14 as described and illustrated in Fig. 1 upon collapse of one of the compartments.

Having described my invention, what I desire to protect by Letters Patent and claim is:

A valve for pneumatic tubes having a plurality of separately inflated and deflated compartments comprising a valve stem, a valve core having a pin and located in said valve stem, an air passage through said valve stem and controlled by said valve core, a plurality of ports communicating with said air passage and adapted to communicate with the tube compartments, said ports being defined in a common wall structure and opening into a common chamber, a cap received upon the outer end of said valve stem and having a seat portion adapted to seat against the outer end of said valve stem to seal said air passage above said valve core, said cap having a portion engageable with said valve core pin to depress the same with said cap seating upon the outer end of said valve stem, valve means for said ports located in said common chamber and operatively connected with said valve core pin for placing said ports into communication with one another when said valve core pin is depressed by said cap, said valve means in one position closing said ports and in another position opening said ports for communication through said common chamber when said valve core pin is depressed to open said valve means.

RICHARD F. MATTHEWS.